United States Patent
Klinner

[11] Patent Number: 5,185,991
[45] Date of Patent: Feb. 16, 1993

[54] APPARATUS AND METHOD FOR SELECTIVE CROP HARVESTING

[76] Inventor: Wilfred E. Klinner, Beechwood, Heath Lane, Aspley Heath, Woburns Sands, Milton Keynes, Buckinghamshire MK17 8TN, England

[21] Appl. No.: 623,435
[22] PCT Filed: Jan. 26, 1989
[86] PCT No.: PCT/GB89/00073
§ 371 Date: Nov. 30, 1990
§ 102(e) Date: Nov. 30, 1990
[87] PCT Pub. No.: WO89/11784
PCT Pub. Date: Dec. 14, 1989

[30] Foreign Application Priority Data
May 31, 1988 [GB] United Kingdom ............... 8812820
Jul. 28, 1988 [GB] United Kingdom ............... 8818054

[51] Int. Cl.$^5$ ............................................. A01D 45/30
[52] U.S. Cl. ........................................ 56/128; 56/220; 56/364
[58] Field of Search ............... 56/127, 126, 128, 130, 56/364, 220

[56] References Cited
U.S. PATENT DOCUMENTS
4,581,880  4/1986  Klinner ...................... 56/364
4,951,451  8/1990  Klinner ...................... 56/128 X
5,044,147  9/1991  Klinner ...................... 56/128 X FOREIGN PATENT DOCUMENTS
0241276  10/1987  European Pat. Off. .
88/05626  8/1988  World Int. Prop. O. .

Primary Examiner—Terry L. Melius
Attorney, Agent, or Firm—Collard & Roe

[57] ABSTRACT

The apparatus for harvesting crops, particularly seed crops, comprises a mobile support structure (20) and a crop stripping device in the form of a rotor (30), which may be attached to height adjustable arms and is driven by drive means (22). The rotor (30) carries transverse rows of wedge form crop stripping elements (10) which may be combined with transverse ribs. The crop stripping elements having prominent leading edges, for example each formed at the junction between two faces which are acutely inclined with respect to each other. They may be attached to removable, raised, hollow mounting bars. The drive to the rotor may be so arranged that during forward movement of the apparatus the crop engaging elements (32) are propelled progressively through the crop, moving upwards at a front region. Seeds and other plant parts detached by the action of the rotor are impelled into a crop flow passage (27) under a crop guide cover (21). Essential dimensions of the rotor and crop engaging elements may be varied conveniently.

25 Claims, 10 Drawing Sheets

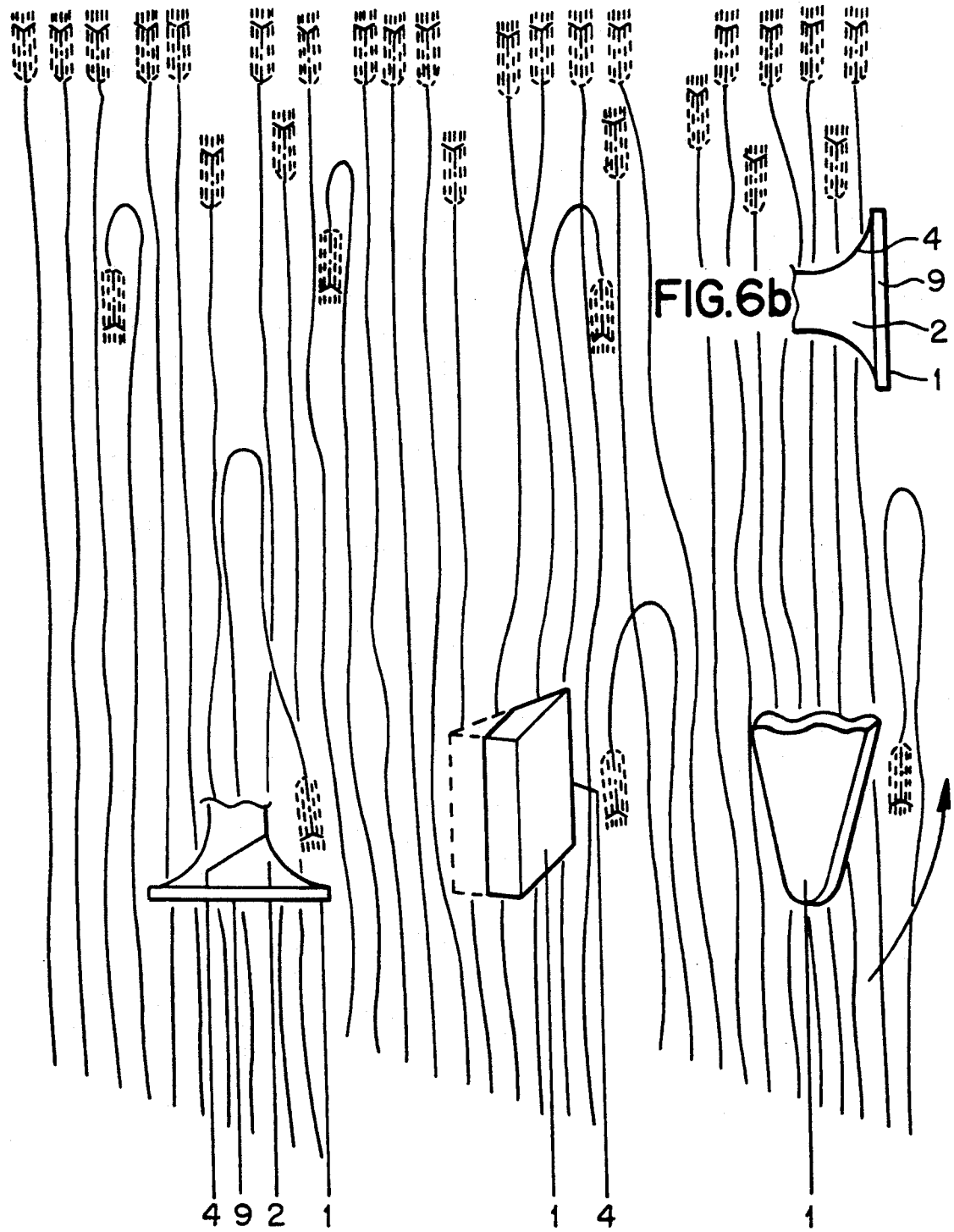

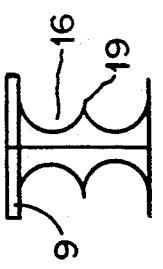 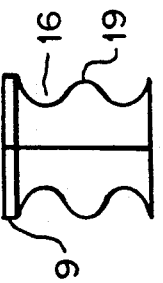 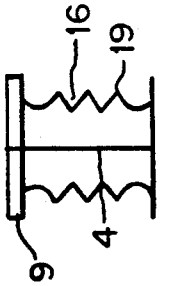
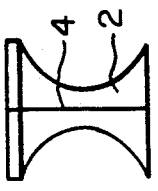 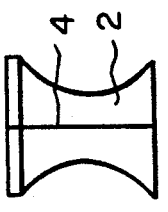 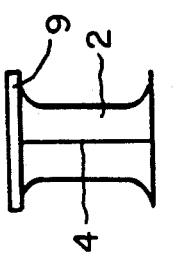
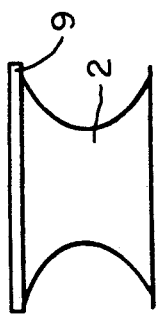 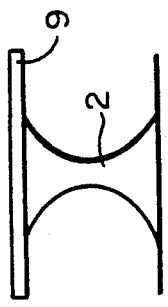 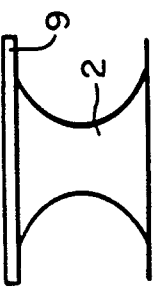
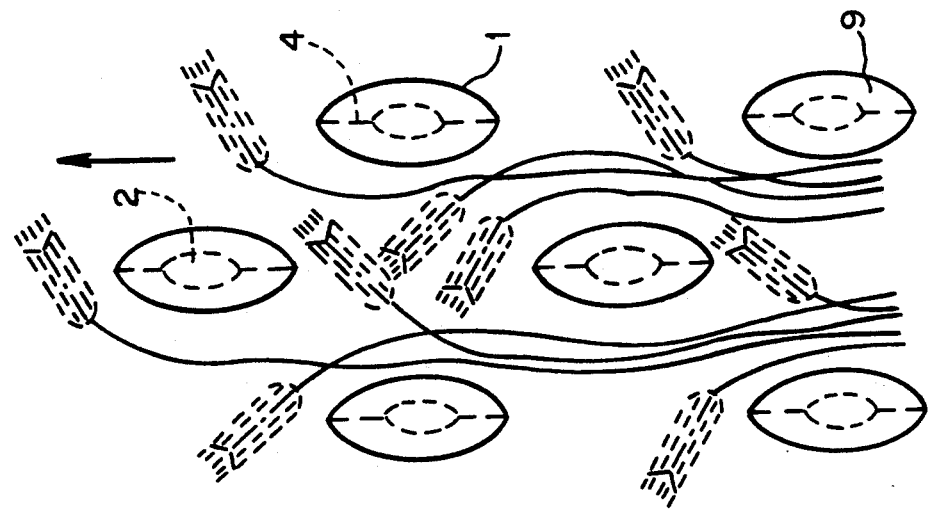

FIG. 15a
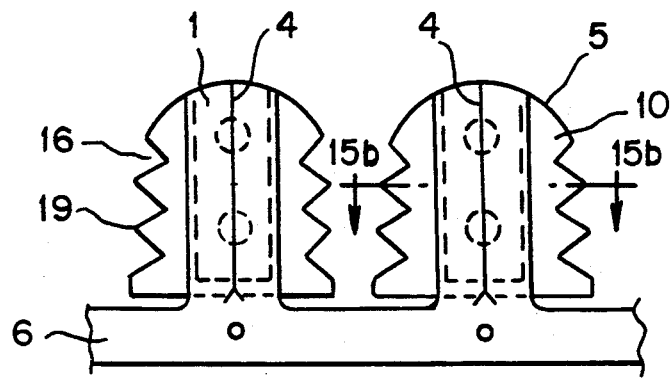
FIG. 15b
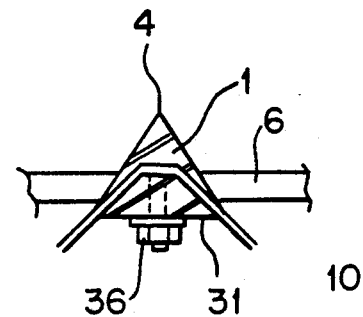
FIG. 15c   FIG. 15d   FIG. 15e
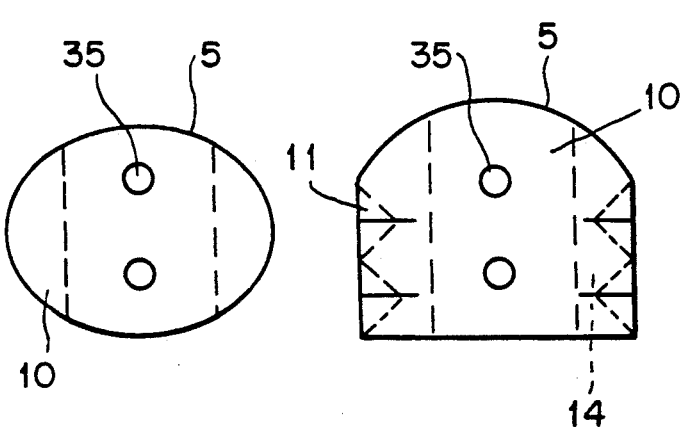
FIG. 16a
FIG. 16b
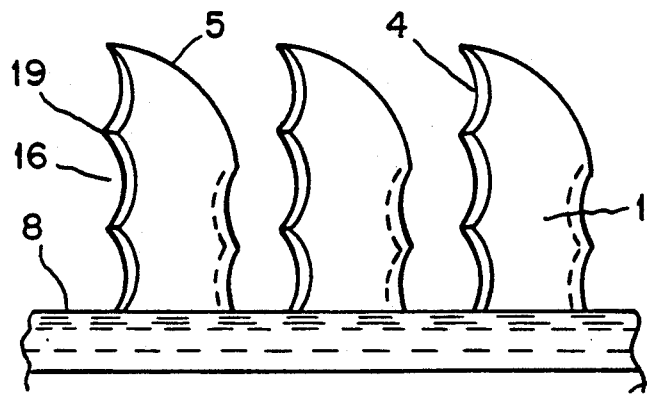
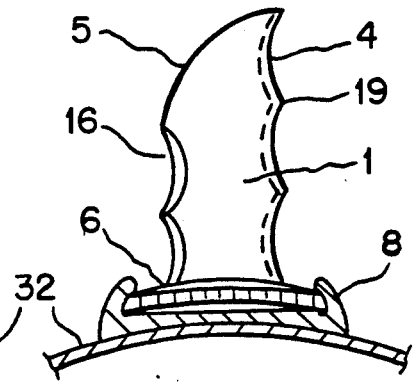

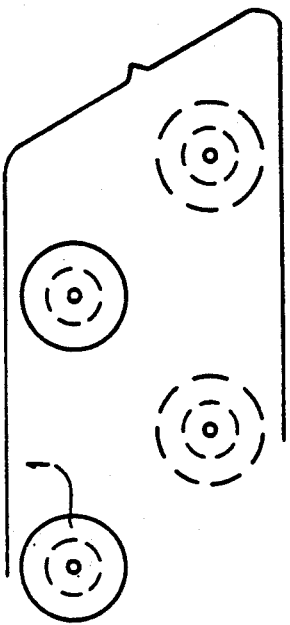
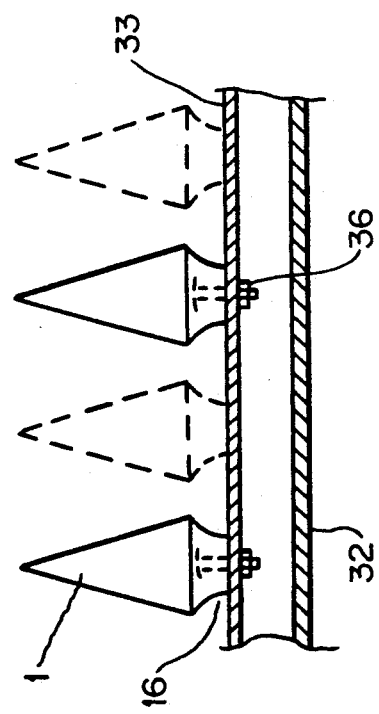
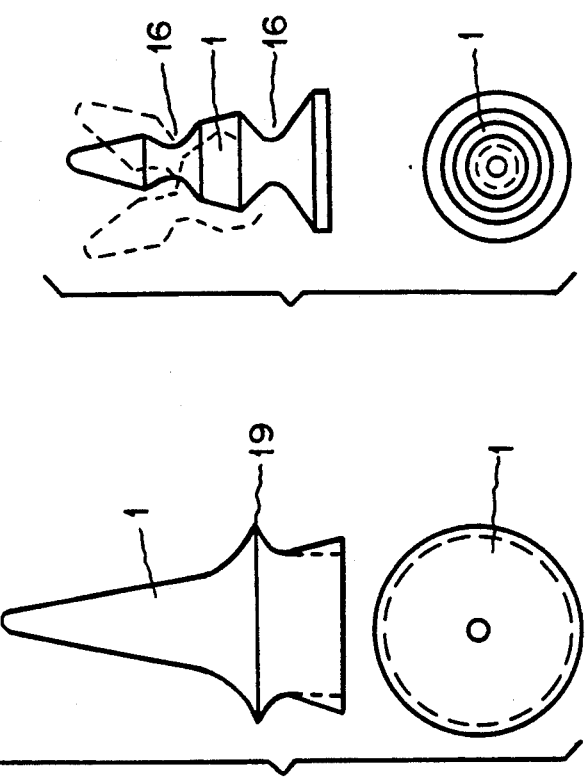
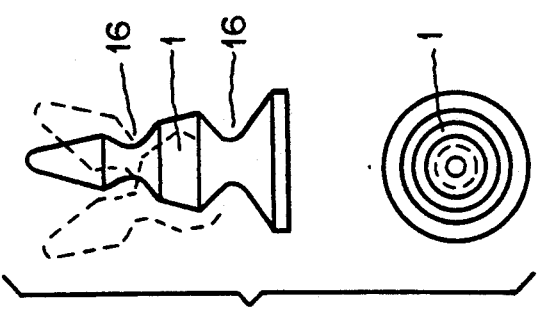
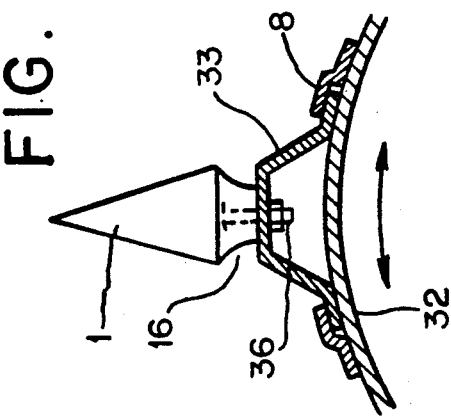

APPARATUS AND METHOD FOR SELECTIVE CROP HARVESTING

BACKGROUND OF THE INVENTION

1. Field of the Invention

The present invention relates to apparatus for, and a method of, harvesting crops. It is concerned with detaching from plants, without cutting them, seeds, seed-bearing parts, seed bodies, and certain fruits and/or foliage, collecting the detached material and separating from it the wanted plant parts. The invention has particular application in the harvesting of grain crops, such as wheat, barley, oats and rice, but also has application in the harvesting of other combinable crops like pulses, oilseeds and herbage seeds.

The invention has further application in the harvesting of nuts and other seed bodies and of flower heads, some fruiting bodies and foliage.

2. The Prior Art

Commonly the harvesting of seed crops, particularly cereal and herbage seed crops, is carried out by a once-over, destructive operation which involves the cutting of the seed-bearing stems near their base. Harvesting machines, particularly combine-harvesters, are easily overloaded by large volumes of crop bulk, because these create problems of seed detachment and separation.

The in-situ stripping of seeds from the uncut crop has been attempted repeatedly and has met with varying degrees of success. In-situ seed stripping by a rotary device became known through U.S. Pat. No. 1,290,484 entitled 'Standing Grain Harvester'. However, none of the early diclosures made adequate provision for satisfactorily harvesting seeds or other wanted parts from crops which are unfavourably presented, because they are either severely leaning, tangled, twisted or laid, with the wanted parts in close proximity to the ground or embedded in matted crop layers.

More recent proposals relating to in-situ seed stripping appear in published International Patent Applications PCT/W086/01972, PCT/W088/04885, PCT/W088/05626, and in GB 2188822A, all of which have the same inventor as the present application. These more recent proposals disclose crop engaging elements which are preferably resiliently mounted or made of resilient material, so that damage is avoided if inadvertent contact is made with the ground or with foreign objects among the crop.

SUMMARY OF THE INVENTION

It is among the objects of the present invention to provide improved apparatus for, and methods of, removing wanted plant parts from an uncut crop, and to overcome many of the known disadvantages of existing harvesting machinery and methods.

More particularly, it is an object of the present invention to reduce losses of wanted plant parts, particularly seeds, which can occur in some crops and conditions with existing crop engaging elements, to keep the fan effect and the energy requirement of crop stripping rotors low, to adapt stripping rotors quickly and easily to crops of different physical characteristics, dimensions and growth habits, to minimise the detachment of unwanted material and to maximise the detachment of individual seeds, as opposed to whole or part seed heads, or of other wanted parts, so that any subsequent task of separating and cleaning the wanted fraction or fractions is facilitated and the required mechanisms may be kept small and simple.

According to one aspect of the present invention there is provided apparatus for harvesting crops comprising: a mobile support structure for movement over the ground; moveable support means capable of being driven relative to the support structure and extending transversely across the direction of forward movement of the apparatus; a plurality of crop engaging elements cantilevered outwards from the moveable support means; means for driving the moveable support means so that the crop engaging elements comb through the uncut crop at a front region, to access, detach and impel wanted parts including seeds; crop containment and guide means extending over or under the apparatus to prevent detached crop particles becoming lost and to direct them rearwards for collection; characterised in that at least some of the crop engaging elements comprise crop stripping elements, each forming at least in the outer region a wedge effective in the direction of rotation, for penetrating and parting the undisturbed crop mass, and each having, for detaching and laterally impelling wanted plant parts, reclined side surfaces with outer boundaries shaped to promote smooth sliding and funnelling of crop material into principal inwardly and circumferentially extending crop engagement channels formed between laterally and circumferentially adjacent elements.

It is believed that separation from the crop mass of the wanted parts, such as seeds, is achieved in embodiments of the invention primarily by beating, prising and shaking such wanted parts off the crop. Other mechanisms involved include bending, breaking, cleaving, tearing and rubbing.

According to another aspect of the invention, there is provided a method of harvesting a crop comprising: moving through the uncut crop an apparatus according to said one aspect of the invention whilst driving said moveable support means so that the crop engaging elements comb through the uncut crop at a front region of the apparatus, whereby each of said crop stripping elements forms at least in the outer region thereof an acute wedge effective in the direction of rotation and which parts the undisturbed crop mass, to access and detach wanted parts from the crop by the effects of reclined surfaces, with outer boundaries shaped to promote smooth sliding and funnelling of the plants into principal inwardly and circumferentially extending crop engagement channels formed between laterally and circumferentially adjacent elements, the method including impelling the detached crop parts in lateral directions towards a collection facility.

The apparatus of the invention operates by detaching from the seed-, flower- or fruit-bearing stems of uncut plants the wanted parts by combing through the crop, leaving the stems standing.

The apparatus preferably also comprises associated compact apparatus for separating already threshed seeds from the wanted and unwanted material detached by combing, and for completing the detachment and separation of seeds from whole or part seed-bearing heads broken off and collected during the combing process.

The present invention finds application in self-propelled machines for harvesting seed and forage crops, and in machines which are mounted on single- or multi-axle tractors to be pushed or pulled through the crop.

The form of the crop engaging elements has beneficial effects upon the effective operation of preferred embodiments of the invention. The size and shape of the elements, together with their operating angles and lateral and circumferential spacings, may be selected to maximise the desired effects in terms of seed detachment and recovery during the combing process.

As plant stems are stroked by fast moving crop engaging elements, the stems are deflected more readily laterally than the relatively heavy seed-bearing heads. Because of their inertia, the seed heads adjacent to elements can be subjected to a whiplash effect. This causes seeds to be shed, particularly when seed heads collide with the crop facing regions of the elements or with each other. Sometimes all or part of a head still containing seeds can break off.

Individual seeds which become detached on, or collide with, crop engaging elements bounce off and, in operation of known harvesters, may be launched into trajectories, particularly forwardly directed trajectories, which are unfavourable for recovery.

In accordance with one preferred feature, in embodiments of the invention, the outwardly projecting crop combing elements are formed from resilient material and are smoothly shaped to promote unimpeded sliding of crop into the principal stripping regions and to minimise the detachment of unwanted plant parts by tearing.

The elements may take the general form of single-bevel and double-bevel wedges, to provide at their side surfaces incident angles with the crop such that detached crop parts, especially seeds, are directed into initial trajectories which are directed sideways and in the direction of rotation. It is preferred that any outer boundaries are inwardly curved, at least in the region of transition into the trailing boundaries of the side surfaces, to avoid in some crops and conditions plant stems getting caught and being torn by abrupt inflections of boundaries.

Conveniently the elements may comprise an outer wedge-shaped shoe or head for prising the crop mass apart and a narrower stem section which is secured at its inner end to the moveable support means. In the outward direction the stem may be flared or tapered from its smallest cross-section to meet the boundaries of the crop dividing shoe. Optionally the stem may also be flared or tapered inwardly from its smallest cross-section.

During movement through the crop whilst this is unsupported by any other component of the apparatus, lateral displacement of plant matter is greatest at the bottom-dead-centre position of rotation, when the transverse plane of the shoe lies normal to the general orientation of plant stems, and it is least at the front-dead-centre position of rotation when the stems lie generally parallel with the transverse plane of the shoe.

In the outward direction the elements may be plain, or they may be ribbed, corrugated or otherwise profiled to reduce mass and friction and to guide detached crop particles into favourable paths and trajectories for recovery. Cavities may be provided in the stem and head sections to maximise the yielding ability of the elements, including in the inward direction. To prevent undesirable elongation under centrifugal effect, elements of great flexibility, particularly hollow elements, may have incorporated into their walls outwardly oriented fibres of appropriate tensile strength so that they do not interfere with the yeilding characteristics of the elements in response to overloads or contact with foreign objects in the crop.

The cross-sectional dimensions of stems may be chosen to promote preferential yielding laterally or fore-and-aft. Relative to a transverse radial plane passing through the base of the stems, the elements may be symmetrical, i.e. equally effective in either direction of rotation, or asymmetrical; when seen in side elevation in the top-dead-centre position of a stripping device rotating clockwise, elements with outer opening shoe may take the general shape of a 'T', and 'I' or an inverted 'L'. The boundary regions of the shoe may be rounded, tapered or otherwise smoothed in the outward direction, to prevent chafing or cutting of the crop.

Crop engaging elements with outer opening shoe and reduced stem section are particularly suited to operating in the overshot mode, so that they move upwards at a front region, and they are particularly effective in lifting severely laid crops for efficient recovery of wanted plant parts. The flared or tapered transition region from the stem to the outer shoe portions assists in guiding detached crop particles into laterally and upwardly directed paths.

In accordance with another preferred feature the crop stripping elements may comprise fins, each forming or being provided with a prominent leading edge region for entering into the crop with minimal disturbance. The prominent leading edge of the crop stripping elements may extend outwards in one direction or in more than one direction, and it may extend in a straight or undulating line.

Conveniently the elements may be flat in their attachment region for predictable yielding in that region if an impact with the ground or with a heavy object should occur. The flat attachment region may be laterally angled relative to the transverse rotor axis so that yielding of the outer region of an element into a reclined position may take place in an inward and lateral direction.

Conveniently there may extend from the prominent leading edge of a crop stripping element on one or both sides a laterally reclined surface so that in operation of the elements the previously undisturbed crop mass is prised apart by the action of a single- or double-bevel wedge respectively, and wanted plant parts are beaten or shaken off and are impelled laterally and at the same time in the direction of rotation of the elements. The trailing side surfaces may be flat, curved, grooved, ribbed or otherwise contoured.

In some embodiments the trailing boundary region of each reclined crop engaging surface may be generally parallel with the prominent leading edge. Preferably the outer boundary may be curved to lead smoothly into the trailing boundary. Other element-defining boundaries may be straight, curved, serrated, scalloped or otherwise profiled to achieve the desired effects.

Conveniently there may be provided, preferably in the boundary regions of the crop stripping elements, recesses and/or protrusions to enhance the stripping effect and impel detached particles into laterally and/or inwardly directed safe recovery trajectories.

Conveniently circumferentially adjacent crop stripping elements may be so spaced laterally that their reclined side surfaces overlap in the direction of movement of the elements, or there may be provided lateral clearance.

In accordance with a further preferred feature a compound crop stripping element may comprise a projection in the form of a strong spine extending outwardly and providing a prominent leading edge. The trailing region of each laterally reclined crop engaging surface may comprise a flap formed of thinner and more flexible material, to allow preferential yielding of the side regions in response to increasing crop pressure and friction.

The flexible side regions may be divided by lateral slits, preferably normal to the prominent leading edge, so that each section forms a flap which may yield independently, allowing intrusion of stiff plant stems into the normal profile of the elements, so that the stems are momentarily enveloped from the sides.

To facilitate the repair of damage or wear to thin flaps and to adapt the elements readily to different crops and conditions, each element may have a spine comprising a leading and a separate trailing portion between which a shaped insert of thin flexible sheet-like material may be clamped in position. The inserts may have different shapes and dimensions, depending on the effects to be achieved.

In accordance with a yet further feature the crop stripping elements may resemble perpendicular or oblique cones or cylinders. In the crop engaging side regions elements of such general shapes afford complete absence of abruptly ending surfaces and outwardly extending abrupt edges formed between faces substantially normal to each other. In consequence cones and cylinders, which may be hollow or solid and alternatively truncated, avoid the harsh scraping effects of abrupt side edges and usually lead to only small amounts of unwanted material and unthreshed seed heads being torn off. Additionally, compared with flat planar elements of triangular shape which can cause high losses in some field conditions, they impel the detached crop particles mainly laterally and in the direction of rotation for safe recovery.

A further advantage is that such elements may be mounted so that their outwardly extending axis is forwardly inclined by up to 45°, or more for special purposes; this can greatly assist in the harvesting of difficult, particularly strong-stemmed crops, which are lying away from the rotor in the direction of forward movement. Preferably the effective length of conical and cylindrical elements is not more than 6 times, and most preferably 2 to 3 times, the maximum diameter.

In embodiments of the invention the laterally reclined crop engaging surfaces of wedge-form elements may lie in more than one plane, and there may be provided surface contouring, including concave or convex moulding and transverse or longitudinal ribbing or corrugating, to improve the stripping and impelling characteristics of the crop engaging surfaces and boundary regions and of any recesses and protrusions.

In preferred embodiments of the present invention the crop stripping elements may form separate or integral extensions of transversely or helically arranged and outwardly directed flat or corrugated ribs. The ribs may be provided with serrations at their outer edge, so that broken-off crop fragments still containing seeds are subjected to a more severe threshing effect on impact with the edge than would be provided in the absence of an edge or by a straight, smooth edge.

Conveniently crop stripping elements may be attached also to the moveable support means so that the elements are interspersed with the transversely or helically arranged ribs. Detached crop parts which fall or slide into the space swept by the ribs may be impelled outwards for recovery. The ridges and depressions formed in corrugated ribs are advantageous, particularly in the harvesting of small and light seeds, in that detached seeds may be collected together into distinct streams.

Conveniently the side edges of acutely serrated and preferably corrugated ribs may co-operate with the stripping elements to direct crop stems laterally into the zone of influence of the elements. Circumferentially successive, acutely serrated ribs may be staggered laterally relative to stripping elements, to intercept and redirect all detached crop parts.

Conveniently crop stripping elements which form extensions of transversely or helically arranged ribs may be connected with the ribs in continuation of the principal plane of the rib in the attachment region, or in a plane different from the plane of the rib in the connecting region.

As an alternative to attaching the crop engaging elements to transversely or helically arranged flat or corrugated ribs or directly to the moveable support means, which may be tubular of circular or polygonal cross-section or may consist of a continuous belt, individual elements, or continuous arrays of elements, may be attached by bonding or by fasteners extending axially, tangentially or in intermediate directions to transverse mounting members. Such members may be hollow and may comprise, for example, lengths of appropriately shaped channel section, bar, rails or batten material made from metallic or non-metallic substances.

Conveniently the intermediate mounting means may be provided at the inner end with flanges extending in and against the direction of rotation of the crop engaging elements. Intermittent or continuous transverse guides, secured circumferentially spaced to the moveable support means, may be provided to allow sections of the intermediate mounting means carrying arrays of crop stripping elements to be slid into position or removed from the side. Conveniently, retention of the end sections may be by set bolts or other known locking means.

Alternatively the intermediate mounting means may be provided at the base with recessed studs, which register for insertion with slotted holes cut into the surface of the moveable support means. After insertion of the recessed studs into the holes, lateral sliding of the bars in the direction of the slots locks the bars in position.

In cross-section the mounting members may form symmetrical or asymmetrical mounting pedestals which may have steep or slanting sides. Conveniently the crop-facing surface or surfaces of the members may serve to impel detached crop material in the direction of rotation of the crop engaging elements. Conveniently also the outer surface and edges of the bars may combine with the elements to locate the elements in their intended positions and to promote stripping of wanted plant parts. To facilitate such effects, outer surface and boundary regions may be profiled or contoured, for example they may be provided with recesses and/or protrusions.

Axial fastening of crop engaging elements to transverse mounting members, which may be hollow or be made conveniently of wood or synthetic materials, may be facilitated if threaded nuts or inwardly extending screws, bolts or pins are moulded into the base portions of elements. Alternatively there may be provided flanges or webs extending to one or both sides of the transverse centre line of arrays of joined crop engaging elements, to enable fastening by any convenient means.

The method of attaching crop engaging and crop stripping elements to mounting bars, which are then slideably or otherwise rapidly secured as assemblies to the moveable support means, provides several advantages. The most important of these include the ability to repair and replace faulty elements quickly and easily, to interchage types of elements readily, for example to adapt the apparatus for harvesting different crops, and to vary the effective stripping rotor diameter and/or the number of transverse rows of elements for specific purposes. Conveniently, alternative mounting bars may have different cross-sectional shapes and dimensions.

To facilitate removal and replacement of quick-fit mounting bars, particularly slideably located bars, a suitably dimensioned and positioned aperture in one or both side plates of the rotor housing may be provided. Alternatively, provision may be made for the guide or other retaining means of one mounting section in each transverse array of elements to be removed or rendered inoperative.

Conveniently some forms of discrete crop stripping element may be mounted so that in operation each such element is self-rotating about its outwardly extending axis. Rotation can enhance the stripping effect, contribute to smooth crop flow, minimise the detachment of unwanted parts and help to distribute wear evenly.

In embodiments of the invention the height-adjustable moveable support means to which the crop engaging elements are secured may be driven to move the elements through the crop in the overshot or the undershot mode, that is to say in such a way that the elements move respectively upwards or downwards at a front region. Conveniently the crop flow passage may extend around the upper part of the crop stripping device, when the device is driven in the overshot mode. In the outward direction the passage may be defined by a preferably smoothly curved crop guide cover which serves to direct detached plant parts rearwards for further processing, cleaning and collection.

In some embodiments of the invention the crop stripping device may be driven so that the crop engaging elements move downwards at a front region. This form of operation is particularly appropriate in short crops and when the crop stripping elements are formed to impel detached plant parts initially inwards relative to the tips of the elements. Conveniently the crop flow passage then extends around a lower part of the crop stripping device, and it may be defined in the outward direction by one or more conveying rotors, or preferably by a belt conveyor, which may be cleated or provided with transverse slats in order to ensure efficient collection of detached particles at a low level.

Preferably the lower conveying means are provided with means for adjustment of the position and angle of inclination relative to the ground, independent of the height adjustment of the stripping rotor and of the apparatus as a whole. Preferably also the stripping rotor is provided with means for adjustment of its fore-and-aft position, so that from a wide range of possible settings the most appropriate combination may be selected for effective and efficient crop recovery regardless of the conditions of the crop and of the ground.

The height-adjustable moveable support means may comprise a horizontal rotor mounted in the mobile support structure substantially transverse to the path of forward movement of the apparatus, or leading at one side, the rotor being provided with at least two transversely arranged arrays or one helically arranged array of crop stripping elements.

Alternatively the height-adjustable, driven moveable support means may comprise a continuous belt or flexible sheet which extends across the full working width of the apparatus, generally transversely to its path of forward movement and horizontally, vertically, or at the top forwardly inclined. The full-width belt or other means may be supported, under sufficient tension to transmit the required driving force, between two rollers or sets of sprockets or wheels.

In embodiments of the invention there may be combined, with the crop stripping device, preferably transversely oriented apparatus for applying primary separation and cleaning to the stripped off seed before delivering it for final separation, cleaning and collection. Conveniently, one form of primary separation and cleaning may be incorporated within the crop guide cover. By relieving the curvature of the cover, the relatively heavy seeds may be allowed to continue to flow at a high level towards a collecting auger, whilst and air curtain directed downwards from a plenum through a recessed slot deflects material on to the ground through a gap behind the stripping rotor.

Additional primary cleaning apparatus for stripped seed samples contaminated with coarse unwanted crop fractions may be provided by replacing with a perforated screen or sieve the floor plate of the kind of crop elevator which is commonly used in conventional combine harvesters for feeding the cut material from the cutting table to the threshing mechanism. Cut seed-bearing crops do not contain worthwhile quantities of free seeds, but during in-situ stripping, particularly of grain crops, over 90% of the seeds may be threshed by the stripping device of the present invention.

The screen which may be provided under the crop elevator may have fixed apertures of different shape and size, or it may be an adjustable-aperture or special sieve. The screen may be kept static, or it may be reciprocated in or across the direction of crop flow or about a pivot positioned in any of a range of locations in or adjacent the screen area.

The present invention may be put into effect in such a way that the apparatus may be attached to and driven by a tractor of single- or milti-axle configuration, that it may be mounted on a self-propelled vehicle with appropriate controls and optionally provided with final seed cleaning means and a holding tank with emptying facility, that it may replace the cutting tables of conventional combine harvesters, that it may be combined with apparatus for compacting the incidentally detached material-other-than-seed (hereafter referred to as MOS) and/or the crop residue, or that it may replace the cutting or pick-up heads of forage harvesters. The last-mentioned application provides the advantages that the comminution mechanism of the forage harvester acts as an effective threshing mechanism to dislodge any seeds not separated from the stripped-off seed heads and that it chops any detached long material, thus increasing the load density in any collecting tank.

Generally the invention finds application in the harvesting of mature seeds by a single pass or in successive passes, including cereals, pulses, oil seeds and herbage seeds, and in the harvesting of whole seed bodies, some fruiting bodies and foliage fractions.

Preferred embodiments of the present invention to be described provide, in addition to compactness of construction offering low weight and cost, the advantages of high work rates and hence low harvesting costs, timeliness of harvesting, extended time available to the farmer for preparing a seedbed for the next crop, and sufficient and economical disposal or utilisation of the crop residue, which dries quickly after rain and is favourably presented for burning, chopping or harvesting, as required.

BRIEF DESCRIPTION OF THE DRAWINGS

Embodiments of the invention will now be described by way of example with reference to the accompanying drawings, in which:

FIGS. 6a, 6b, 7 and 8 show perspective diagrammatic views from a rearward direction of three different configurations of crop stripping element on entering a cereal crop;

FIG. 9 indicates schematically the interaction between crop stems, seed heads and wedge-form stripping elements with crop-parting outer shoe portions, as it appears in plan view in a section of the development of the surface of a crop stripping device;

FIGS. 10a–c, 11a–c and 12a–c are schematic representations of the principal forms of crop stripping element having a crop-parting shoe in the outer region;

FIGS. 15a and 15b show respectively front and cross-sectional end elevations of compound crop stripping elements having replaceable flexible side flaps;

FIGS. 15c–e show replaceable inserts providing side flaps of alternative shapes;

FIGS. 16a, 16b and 16c are respectively front elevation, side elevation, partly in section, and plan view of fin-like crop stripping elements;

FIGS. 18a, 18b and 18c are respectively front elevation, partly in section, plan view and side elevation, partly in section, of alternative crop stripping elements to those shown in FIGS. 17a–d;

FIGS. 19 to 23 are side elevations and plan views of alternative forms of discrete crop stripping element;

DESCRIPTION OF THE PREFERRED EMBODIMENTS

Figure 1:
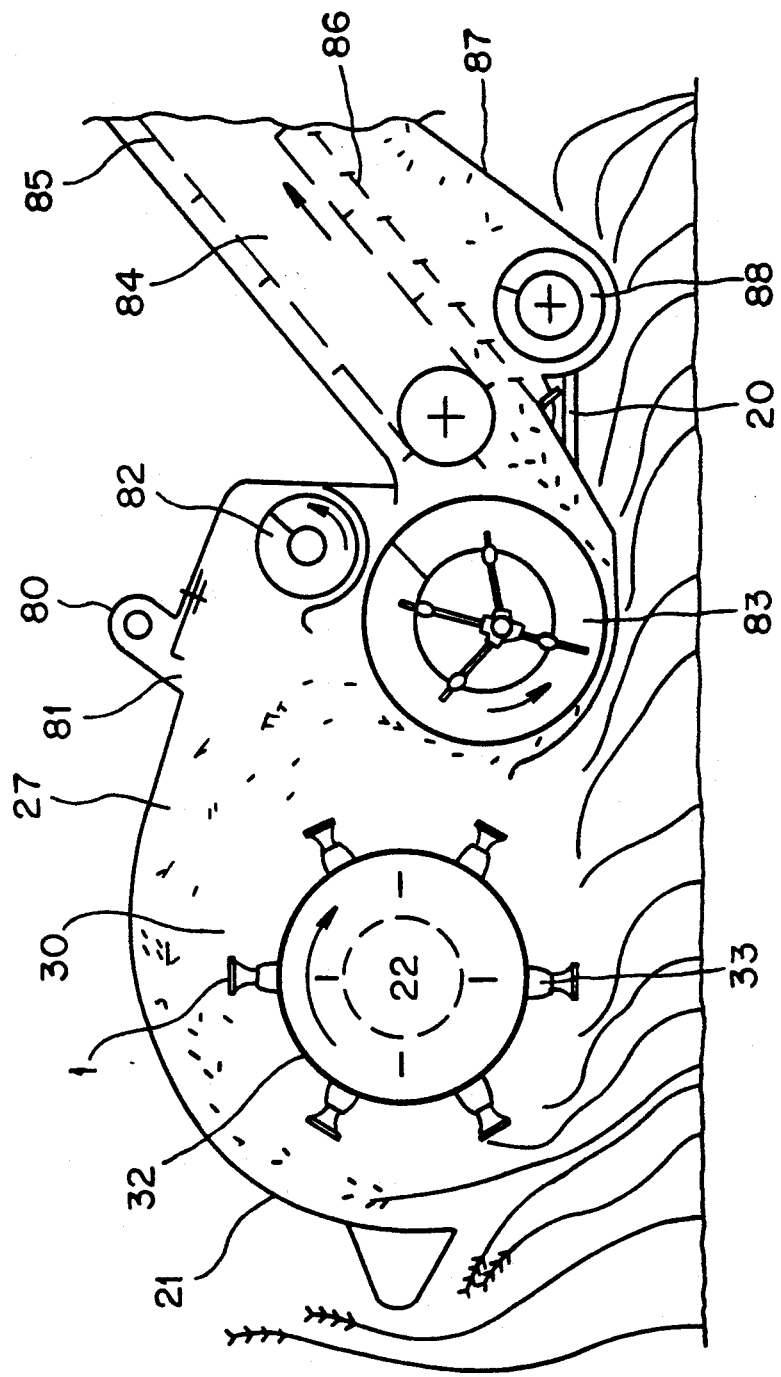
FIG. 1 is a diagrammatic cross-sectional side elevation of a stripper harvester embodying the invention.

Throughout this specification corresponding components of the various arrangements have been given identical reference numerals. For brevity and simplicity the functions and inter-relationships between the various components are described and explained only when they are first mentioned and not fully in connection with each figure. Thus it is to be appreciated that each time corresponding components with identical reference numerals are shown or referred to, the appropriate description applies.

Referring first to FIG. 1, there is shown in diagrammatic cross-sectional side elevation a generalised layout of one embodiment of the present invention for harvesting crops by stripping off the wanted parts in situ. The apparatus comprises a mobile support structure, or frame, indicated generally at 20, for movement over the ground when pushed or pulled by a tractor or when attached to a self-propelled power unit.

Connected to frame 20 is a moveable support means 32; in the embodiment shown this is a hollow tube, but other support means may be used, for example a continuous belt. Mounted on the support means 32 is a plurality of outwardly projecting crop engaging elements 1, which may take several different forms, as described hereinbefore and hereafter. In combination the moveable support means 32 and the crop engaging elements 1 form a rotary crop stripping device 30. This is driven by drive means indicated diagrammatically at 22, which may comprise a drive train made up of gears, belts, chains and/or hydraulic means, using power derived conveniently from the engine of the operating unit.

The direction of rotation of crop stripping device 30 is such that the crop engaging elements 1 comb through the previously undisturbed crop in the upward direction at a front region, prising the unrestrained crop mass apart by a wedge action. Detachment and impelling for collection of wanted plant parts is accomplished at peripheral speeds in the approximate range of 8 to 40 m/s at the tips of elements 1 by beating, bending, cleaving, tearing and rubbing the crop. It is achieved to an extent also by shaking due to the whiplash effect resulting from appropriate lateral inclinations and the lateral and circumferential spacings of the elements as they comb through the crop.

In operation of the device there are formed between laterally and circumferentially adjacent crop stripping elements 1 inwardly and circumferentially extending crop engagement channels bounded by the reclined outer and/or side regions of adjacent elements 1. These crop engagement channels may also be described as the crop stripping regions of rotor 30.

To prevent material detached from the crop by stripping device 30 becoming lost, there is provided a crop containment and guide cover 21; this cover is preferably smoothly curved and extends from in front of the seed stripping region to beyond the rear of stripping device 30. The unobstructed space beneath the cover 21 forms a crop flow passage 27.

In the embodiment shown in FIG. 1 the stripped material is propelled towards an adjustable transverse aperture 81 through which an air curtain from a plenum or manifold 80 may be directed downwards at a gap between the rotor 30 and the crop collecting auger 83. The plenum 80 may be supplied with air from a remote fan or fans. When the apparatus is used to harvest seeds and other bodies which are denser than incidentally removed foliage particles, the densest fraction tends to move in the upper region under the crop containment cover 21.

The air curtain may be adjusted to allow the wanted dense fraction to pass readily, to be collected in upper auger 82 for conveying to one side of the apparatus and thence into a container. The somewhat lighter and larger fractions may be deflected by the air curtain into crop collecting auger 83, whilst the lightest fractions may be blown on to the ground through the gap in the apparatus behind rotor 30.

Auger 83 has series of retracting fingers over part of its length which serve to push the collected material into ducting 84 where an elevator 85 conveys it to a higher level for further processing or collection. Any seeds which may still be present may be separated from the coarse non-seed fraction through a screen 86, which is shown diagrammatically to provide the floor of duct 84. The floor may be made rough optionally by sieve protrusions, to provide resistance to the movement of crop particles still containing unthreshed seeds, so that such seeds may be dislodged as they are forced over the protrusions by the crop engaging members of elevator 85. A ramp 87 directs the further separated seeds into a transverse conveyor 88, conveniently an auger conveyor, for transfer and subsequent collection on one side of the apparatus.

Screen 86 may be provided over the whole or part of its surface area with apertures which allow mainly seeds and not coarse material to pass through. The apertures may be of fixed size and shape; alternatively the screen 86 may be a sieve with adjustable apertures, for example a frog-mouth or laminar-type sieve. Conveniently the screen 86 may be actuated by pivotal motion, or it may be reciprocated in or across the direction of crop flow, or it may be kept static.

Reference is made next to the crop engaging elements which perform the important functions of opening up and dividing the undisturbed crop mass and providing access to the wanted plant parts so that these may be detached and impelled into safe paths for collection.

Figure 2A:
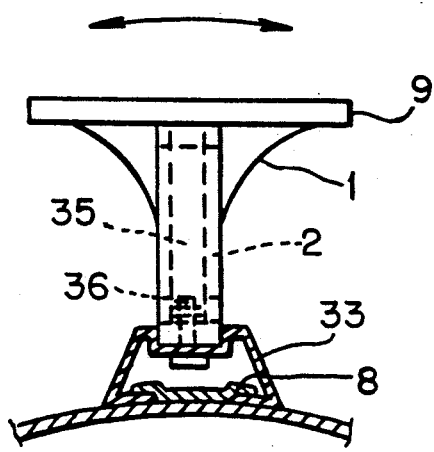
FIGS. 2a, 2b and 2c are respectively front elevation, side elevation and plan view of a crop stripping element having a crop dividing shoe at its outer end.
Figure 2B:
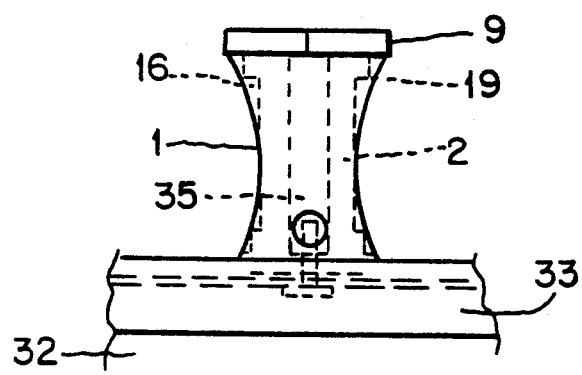
Figure 2C:
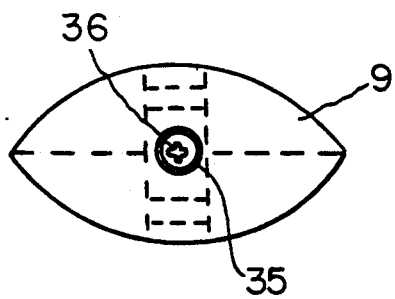

In FIGS. 2a, 2b and 2c there are shown respectively a front elevation, a side elevation and a plan view of a crop stripping element 1 comprising an outer shoe or head 9 principally for parting the undisturbed crop and a stem portion 2 primarily for detaching and impelling wanted crop parts. From its narrowest region the stem portion 2 may be flared or tapered in the outward direction to meet the leading and trailing boundary regions of head portion 9.

Alternatively, in the outer region the sides of stem section 2 may be provided with steps 19 and relief regions 16, as shown in broken outline, to assist in the removal of wanted plant parts, particularly seeds, from the forward facing regions of plant stems.

Optionally stem portion 2 may be flared, tapered or stepped laterally also in the inward direction, to provide firm support in the mounting region. Depending on the loads imposed in operation on the element, which is made preferably of impact and wear resistant flexible material, yielding may take place in the narrow stem region in any direction.

A cavity 35 extending centrally inwards for most of the way from the outer surface increases the yielding potential of the element, saves plastic material and permits insertion and access to axial fastening device 36.

Preferably, element 1 is secured to the outer surface of channel-section mounting bar 33, which, at its base, has two flanges turned towards each other in contact with the outer surface of moveable support means 32, the flanges being retained by guides 8 secured by screwing, pinning, welding, bonding or other methods to the moveable support means 32. The arrangement allows lengths of mounting bar 33 complete with elements to be withdrawn, for repair or substitution, through an aperture which may be provided in one or both side plates of the rotor housing.

In optional arrangements, shown later in FIGS. 17 and 18, the base flanges of mounting bar 33 may be turned away from each other to register with separate guides 8 located alongside the channel section. Conveniently, as an alternative method of replacing elements or mounting bars, one of the guides 8 may be made detachable, to allow at least one section of bar 33 to be removed initially; adjacent sections may then be slid along for subsequent removal.

Conveniently the outwardly extending sides of mounting bar 33 serve to impel detached crop parts in the direction of rotation of the elements 1. Conveniently also the dimensions of mounting bar 33 may be varied to suit different requirements. In particular, if the outwardly extending height is varied, the effective diameter of stripping rotor 30 may be changed, or it may be kept constant when elements of different length are to be used.

To prevent rotation of element 1 about its outwardly extending axis, the outer surface of mounting bar 33 may be recessed transversely, as shown in FIGS. 2a and 2b. Other profiles of the outer surface may be provided to facilitate the mounting of elements and assist in the detachment and recovery of wanted crop parts. To permit tangential fastening of individual elements or of strips of conjoined multiple elements, mounting member 33 may be provided in its outer region with a transversely extending fin or flange.

Figure 3C:
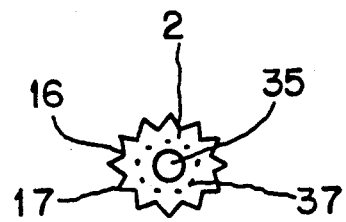
FIGS. 3a, 3b and 3c are respectively front elevation, side elevation and cross-sectional view in the direction of arrows AA in FIG. 3b of an alternative element to that shown in FIGS. 2a–c.
Figure 3A:
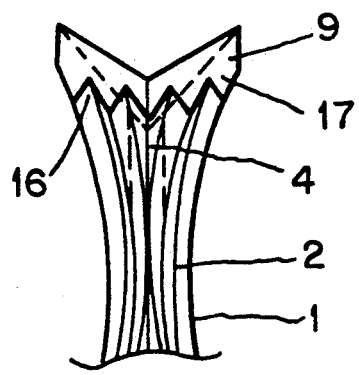
Figure 3B:
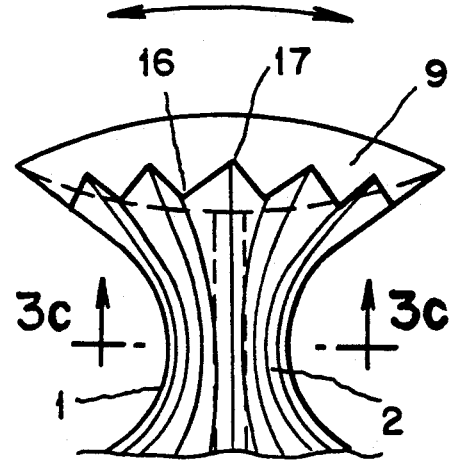

FIGS. 3a, 3b and 3c show respectively a front elevation, a side elevation and a cross-sectional view in the direction of arrows AA in FIG. 3b of an alternative element in which the flared stem section 2 is provided with corrugations comprising outwardly extending recesses 16 and ridges 17. One such ridge forms the prominent leading edge 4. The outer boundary of opening shoe 9 is convex in the direction of rotation, and the shoe has a transversely V-form central recess with an inner boundary which is concave fore and aft.

A central cavity 35 extends inwards from the shoe portion for most of the length of the stem section. Conveniently the element may be made to be a thick-walled hollow element, so that minimal material is required and rapid and responsive yielding may be provided in case of impact with foreign objects.

The wear qualities of some plastics, particularly polyurethane, improve with decreasing hardness, but the risk of elongation under centrifugal effect increases. Use of highly wear resistant materials may be facilitated by the incorporation during manufacture of bundles of fibres of high tensile strength, as are shown by way of example at 37 in FIG. 3c.

Figure 4A:
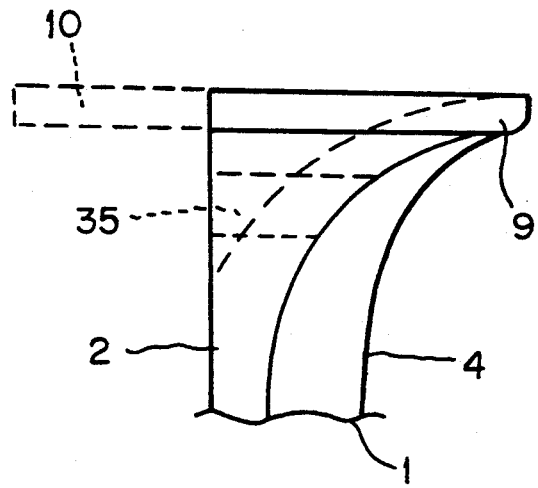
FIGS. 4a, 4b and 4c are respectively side elevation, front elevation and plan view of an alternative element to that shown in FIGS. 2a–3c.
Figure 4B:
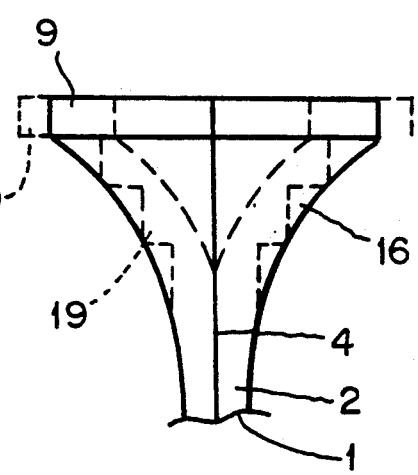
Figure 4C:
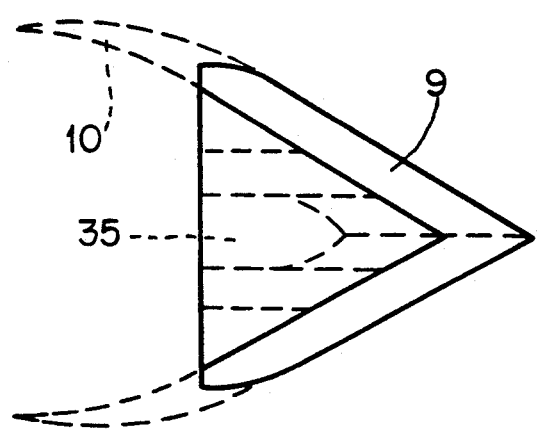

FIGS. 4a, 4b and 4c show respectively a side elevation, a front elevation and a plan view of an alternative element 1 with outer crop parting shoe 9, the element comprising essentially only the leading half of the elements described in FIGS. 2 and 3. An optional feature comprises rearwardly extending, flexible, curved wings 10, which increase the crop parting effect of shoe portion 9 and enhance the effectiveness of stripping. Void space 35 is deepest in the trailing edge region of opening shoe 9.

Figure 5A:
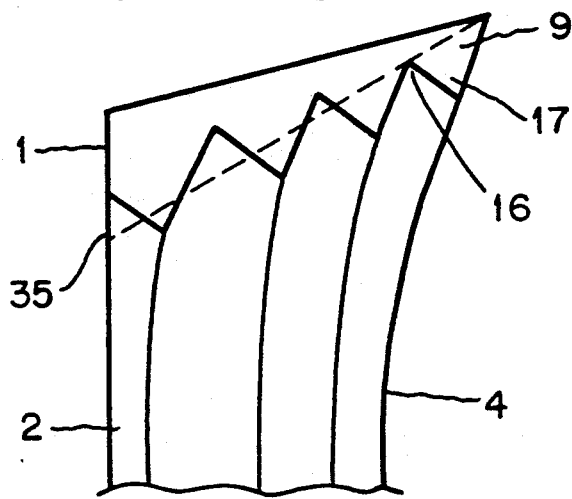
FIGS. 5a and 5b are respectively side and front elevations of an alternative element to that shown in FIGS. 4a–c.
Figure 5B:
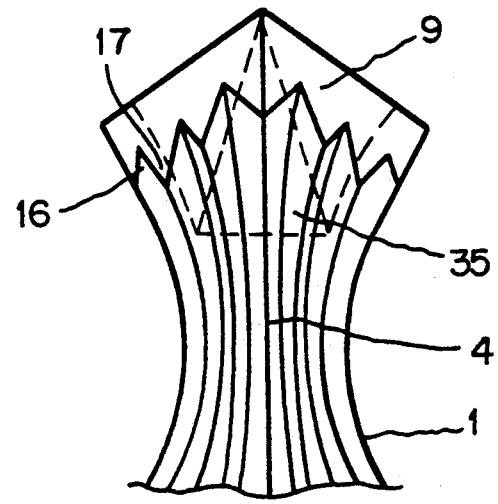

In FIGS. 5a and 5b are shown respectively side and front elevations of an alternative element to that shown in FIGS. 4a–c. The stem portion 4 is coarsly corrugated or grooved. Additionally the tip of shoe portion 9 lies outwardly displaced relative to the trailing boundary. This feature helps to penetrate and recover severely matted crops.

In FIGS. 6a, 7 and 8 are shown perspective diagrammatic three-quarter rear views of three different configurations of crop stripping element as they enter a cereal crop in which, as often happens in practice, some of the crop stems are bent over so that their seed heads are located at a low level.

The element in FIG. 6a has an outer crop parting shoe 9 and is symmetrical about its outwardly extending axis. In the bottom-dead-centre position, when the plane of the opening shoe is normal to the general orientation of the crop stems, the stems are forced apart by at least the width dimension of the shoe. At the front-dead-centre position, which is depicted in FIG. 6b, the plane of the shoe portion lies parallel to the crop stems, allowing them to close in and to make rubbing contact with the stem portion 2 of the element. During passage through the lower front quadrant of rotation, any seeds stripped off will be directed mainly laterally and upwardly by virtue of the shape of the outer region of the element.

Because of the inclination of the principal crop engaging side surface relative to the direction of movement of the single-bevel element with prominent leading edge 4, shown in FIG. 7, any seeds dislodged will be impelled mainly laterally and also in upward directions.

For comparison a planar crop stripping element 1 with flat leading surface presented initially parallel and face-on to the crop stems is shown in FIG. 8. Such an element may launch particles easily dislodged from mature seed heads in the lower crop regions into low trajectories unfavourable for safe recovery. The action of the abrupt edges is severe, so that in commercial seed crops substantial quantities of MOS may be detached incidentally.

In FIG. 9 is indicated schematically the interaction between crop stems, seed heads and crop stripping elements having outer opening shoe portions 9 and reduced stem sections 2, as seen in plan view in a section of the development of a surface of a crop stripping device according to the invention. The staggered formation of the elements in and across the direction of movement relative to the 'tethered' crop induces lateral whiplash.This causes the heavy seed heads to be threshed by repeated impact, in the crop engagement channels, with the side regions of laterally and circumferentially adjacent elements and with each other. Detached particles, particularly seeds, are impelled sideways and in the general direction of rotation of the elements.

In FIGS. 1a–c, 11a–c and 12a–c are shown schematic representations of the principal forms of crop stripping element having a crop parting shoe in the outer region and a reduced-section stem. The 'a' column depicts side elevations, the 'b' column corresponding front elevations and the 'c' column front elevations of special front profiles for specific crops and conditions.

Thus, FIG. 10 represents an element in which the stem section is reduced substantially in width but only marginally fore and aft. Consequently, yielding under excess load conditions can be expected to take place primarily to either side. The special front profile of the stem portion 2 provides a central ridge 19 extending from front to rear. It allows particularly coarse-stemmed and bulky crops to be guided by the intermediate ridge 19 into inner and outer stripping spaces 16 for efficient removal of wanted parts.

The element represented by FIG. 11 has a stem portion 2 which is substantially reduced in section fore and aft but only marginally across the width. In consequence yielding of the outer shoe section may be expected to take place primarily in the direction of rotation. The special front profile in FIG. 11c is similar to that in FIG. 10c but is particularly suitable for sparser and more vulnerable crops which require less space and gentler treatment.

FIG. 12 represents an element in which the stem section 2 is dimensioned to yield readily in any direction. The special front profile, providing multiple ridges 19 and furrows 16, is particularly suited to fine-stemmed crops and others which are difficult to strip.

For some crops and conditions it is preferred that the stem portions of the crop stripping elements referred to in FIGS. 1 to 6 and 9 to 12 have crop engaging side and outwardly extending boundary regions formed in the rearward direction of smooth continuous surfaces, free of abrupt and definitive edges or other disruptions and surface discontinuations, so that plant parts are detached entirely by the effects of beating without scraping. Such action gives important benefits, compared with the effects of elements provided with conspicuous side edges for acting aggressively upon the crop. In particular, detachment of MOS and of crop portions still containing seeds is usually substantially less, and the proportion of seeds threshed out of the seed heads cleanly can be higher by a factor of up to around 2, sometimes totalling over 98% of the collected seed yield.

Figures 13A, 13B, 13C:
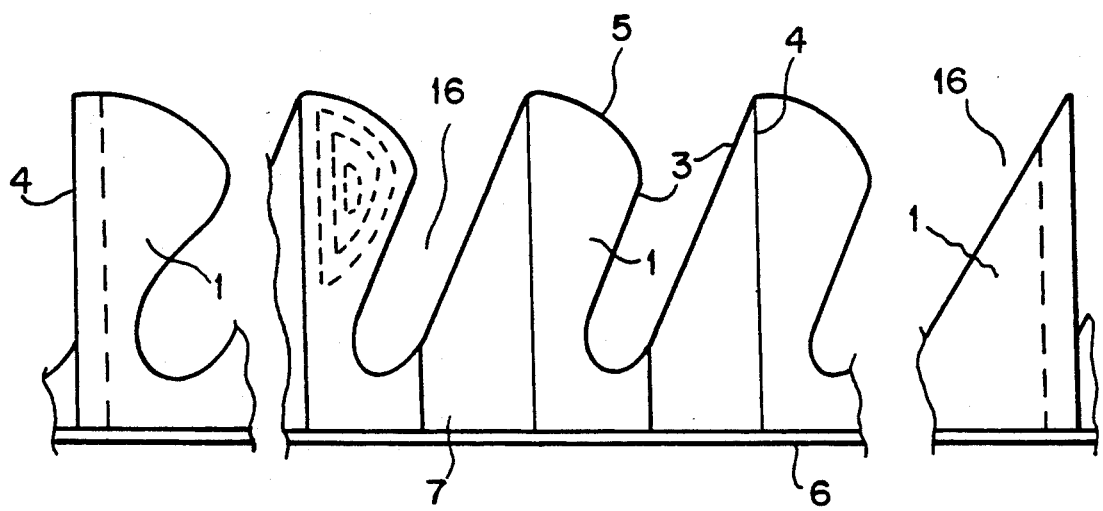
FIGS. 13a, 13b, 13c and 13d are respectively cross-sectional elevation from one side, front elevation, cross-sectional elevation from the other side and plan view of asymmetric wedge-form crop stripping elements incorporated into corrugated transverse ribs provided at the base with flanges or webs for axial fastening.
Figure 13D:
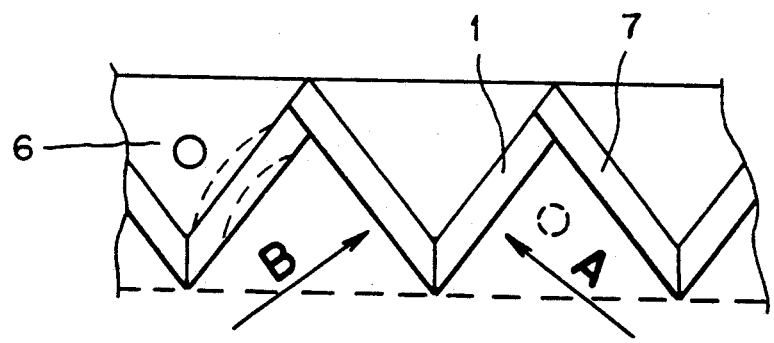

FIGS. 13b and 13d show respectively a front elevation and a plan view of a section of a transverse, corrugated array of crop stripping elements 1 in which the crop is prised apart by prominent leading edge 4. As seen in FIG. 13b, trailing edge 3 emanating from the outer end of prominent leading edge 4 is slanted sideways and converges on to trailing edge 3 of the adjacent element 1, the outer edge 5 of which is curved, to help funnel crop smoothly for stripping into recess 16 between adjacent elements. In operation of the elements, trailing edges 3, on both sides of the inner part of recess 16, appear substantially parallel.

FIGS. 13a and 13c are respectively views in the direction of arrows A and B in FIG. 13d normal to the two side faces of each corrugated element 1. A particularly advantageous feature of this arrangement of corrugated crop stripping elements is the generously dimensioned outer inlet funnel, generally indicated at 16, which is formed between two surfaces lying in different planes relative to one another.

Optionally the 'lobes' of the elements depicted in FIGS. 13a–d may be concave on their crop facing side, as indicated in the left-hand element of FIGS. 13b and 13d, to favourably affect the trajectories of impelled detached crop particles, particularly seeds.

Figure 14:
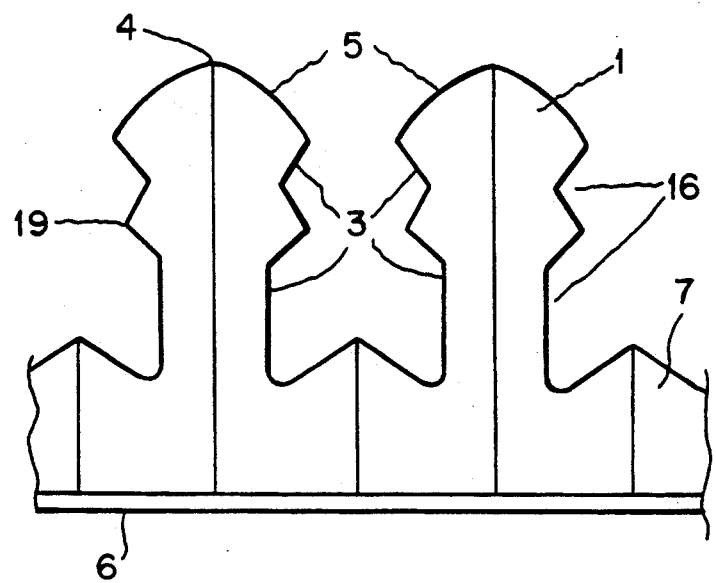
FIG. 14 shows symmetrical alternative elements to those in FIGS. 13a–d.

FIG. 14 is a front elevation of a short section of an alternative array of corrugated crop stripping elements 1, the elements being symmetrical and having recesses 16 formed by trailing edges 3 in continuation of curved outer edges 5. The serrated corrugations 7 at the inner end of recesses 16 serve to divide the trapped crop and to guide it sideways for complete stripping by trailing edges 3 and protrusions 19.

Elements which are corrugated or are attached to corrugated ribs may be secured by means of tangential fasteners to plain or shaped supports extending outwards from the moveable support means, or they may be secured by axial fastening means on to the surface of the moveable support means or on to raised transverse members serving as mounting bars. Axial fastening of the elements shown in FIGS. 13 and 14 is facilitated by the provision at their base of circumferentially extending flanges or webs 6 joined to the corrugations on one or both sides. Webs 6 also ensure that the angular relationship of the corrugated surfaces is maintained.

FIG. 15a is a front elevation of crop stripping elements 1 having flexible side regions, and FIG. 15b is a cross-sectional end elevation of one such element when viewed in the direction of arrows CC in FIG. 15a. Leading edges 4 are provided by spine-like projections extending outwardly from a common base flange 6 provided for attachment by generally tangential fastening means directly or indirectly to moveable support means. The laterally extending wings or flaps 10 of each crop engaging element 1 form extensions of the reclined side surfaces of the projections. Flaps 10 may be provided, for example, by profiled pieces of flexible sheet plastics material, each of which may be clamped between the respective projections providing leading edge 4 and a tapered block 31 at the rear. Block 31 may be bolted or otherwise secured to the projection providing leading edge 4.

The arrangement permits use of thin, sheet-like inserts so that the laterally protruding wings or flaps 10 are particularly flexible and may be readily replaced and interchanged. The flexibility may be such that only in operation of the apparatus are the wings maintained in their effective working positions under centrifugal effect and are able to yield rearwards in response to increasing crop pressure and friction. The outer edges 5 of the composite element are curved to ensure smooth lateral sliding of the plant stems into the stripping regions between adjacent elements.

FIGS. 15c, 15d and 15e show inserts of alternative shape, each having two holes 35 for positive location on the dowels or pins 36 provided to extend rearwards in the spine-like projections which provide leading edge 4. Different edge profiles of the crop engaging side regions of the thin inserts may include serrated, smoothly curved, a continuous straight edge or one which is subdivided by slits 11 or by parallel-sided slots, and feather-edged which comprises small serrations terminating in short slits.

The individual flaps formed by slitting may yield independently, and this may allow intrusion of plant stems into the normal profile of the elements so that the stems become enveloped momentarily from the sides. The slits 11 may be provided at different angles, and optionally they may be replaced by parallel-sided slots or other forms of recesses.

Figure 16C:
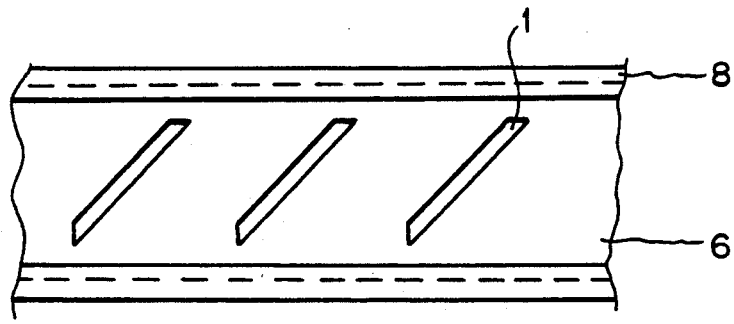

In FIGS. 16a, 16b and 16c are shown respectively a front elevation, a side elevation, partly in section, and a plan view of fin-like crop stripping elements which have as an integral part a base plate 6 for securing directly or indirectly to moveable support means 32. The prominent leading edge 4 may be scalloped or serrated and optionally sharpened to aid intrusion and penetration of matted crop layers where necessary.

The outer edges 5 of elements 1 have a pronounced curvature, to promote particularly smooth and easy sliding of crop material into the laterally offset stripping regions between adjacent elements. Base plate 6 may be slideably inserted into a guide plate 8, which may be attached releasably or by welding, bonding or other methods to the moveable support means 32.

Figure 17A:
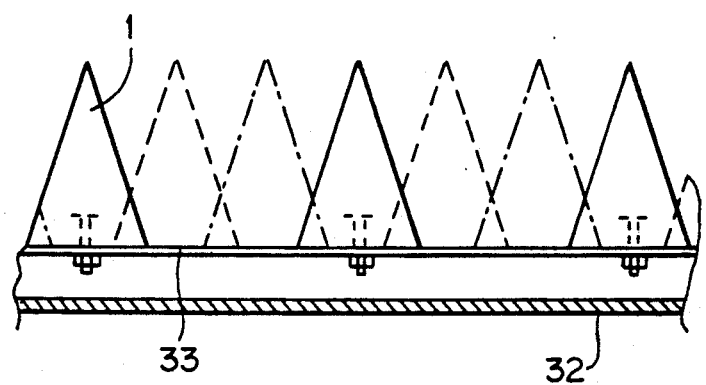
FIGS. 17a and 17b are respectively front elevation and plan view of an arrangement of cone-shaped crop stripping elements, mounted indirectly on the moveable support means in different orientations.
Figure 17C:
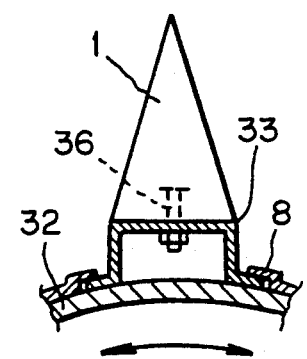
FIGS. 17c and 17d are side elevations, partly in section, of cone-shaped crop stripping elements mounted indirectly on the moveable support means in different orientations.
Figure 17B:
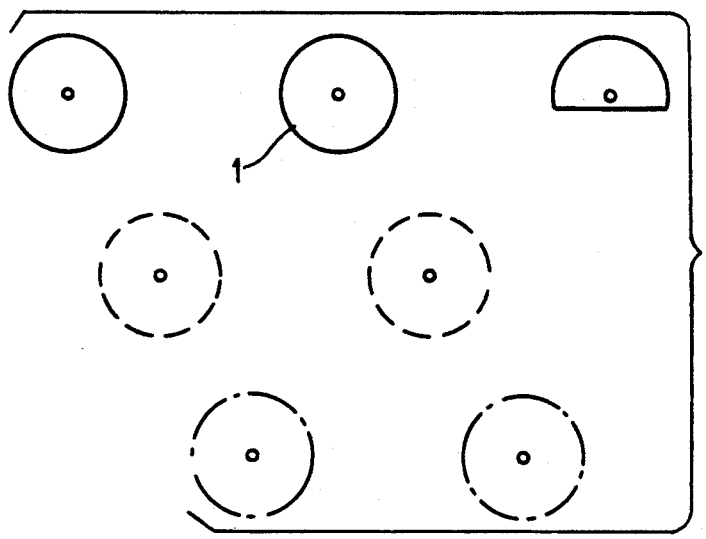

In FIGS. 17a and 17b is shown respectively in front elevation and plan view a section of the development of a cylindrical crop stripping rotor in which the crop stripping elements comprise cones made of resilient plastic material and mounted in successive arrays to cause lateral bending of stems and whiplash of the seed-bearing heads.

In operation each cone-shaped element 1 presents to the crop a wedge providing on each side of the crop engaging region curved, laterally continuous and progressively reclined surfaces. Absence in the crop engaging side regions of outwardly extending abruptly ending surfaces and abrupt edges formed between planes broadly normal to each other, as are presented by some flat planar elements, reduces the detachment of non-seed material, for example when harvesting cereal and pulse crops, and it causes the detachment of wanted plant parts mainly by the effects of beating rather than scraping.

Incorporated into the base portion of each element 1 may be a threaded bolt, dowel, nut or other means for axial attachment to a transversely extending channel-section mounting bar 33, which is slideably attached to the tubular moveable support means 32. Successive transverse arrays of cone-shaped crop engaging elements 1 comb through the crop at lateral and circumferential spacings which allow the seed heads to penetrate inwards towards the base regions of the elements.

The elements 1 shown in full outline comprise the leading array, and those in broken and chain-dotted outlines represent the second and third transverse arrays respectively. The right-hand element of the leading array is shown to be optionally the major leading portion of a vertically split cone.

FIG. 17c is a side elevation, partly in section, of the leading array of cone-shaped crop stripping elements 1 shown in FIG. 17a. The hollow mounting bar 33 is retained in guides 8 and has steep sides of equal length normal to its flat outer surface.

Figure 17D:
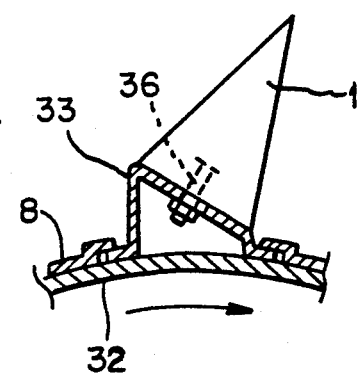

In FIG. 17d the mounting bar 33 is shown to be shaped to incline elements 1 in the direction of rotation of moveable support means 32. Such inclination can contribute to the minimisation of seed loss and damage in some crops and conditions. The angle of such inclination, relative to the radius from the axis of rotation of support means 32 through the base of the outwardly extending axis of element 1, may be up to 45°, or greater for special purposes.

FIGS. 18a and 18b show respectively a front elevation and a plan view of crop stripping elements 1, with annular recesses 16 at the base, secured axially to a transverse hollow mounting bar 33. By way of example the elements 1 in each transverse array are shown to occupy alternate stations circumferentially, but less than or double the population density shown may be provided.

The arrangement illustrated causes the final stripping of wanted crop parts to take place by the co-operation of the recessed base regions of elements 1 with the outward facing surfaces of hollow mounting bar 33.

FIG. 18c is a side elevation, partly in section, of the arrangement in FIG. 18a. Hollow mounting bar 33 has leading and trailing side faces which converge in the outward direction to impel detached crop parts in either direction of possible rotation of the elements with minimal risk of loss.

FIGS. 19 to 23 are examples, in side elevation and plan view, of alternative conical and cylindrical crop stripping elements producing the effects of a double-bevel wedge. They are particularly suited to separating seeds from crop, with minimal detachment of MOS, because of the said absence in the crop engaging side regions of outwardly extending abrupt edges and other disruptions or surface discontinuations.

FIG. 19 shows a cone with an annular protrusion 19, to agitate the crop and contribute to the stripping of forward-facing areas of crop stems. The base region may be cylindrical and/or waisted.

FIG. 20 shows a cone which is waisted at two levels in such a way that yielding in any direction can readily occur. The waisting, which forms annular recesses 16, also contributes to the efficient stripping from forward-facing stem regions. Generally, single or multiple annular recesses may act as multi-directional hinges or joints in elongate elements. The degree of waisting determines the ease and extent of deflection of sections of the elements under excess load conditions. For some purposes waisting may be so pronounced that only in operation of the apparatus are the elements maintained fully in their intended attitude by centrifugal effect.

Figures 21, 22, 23:
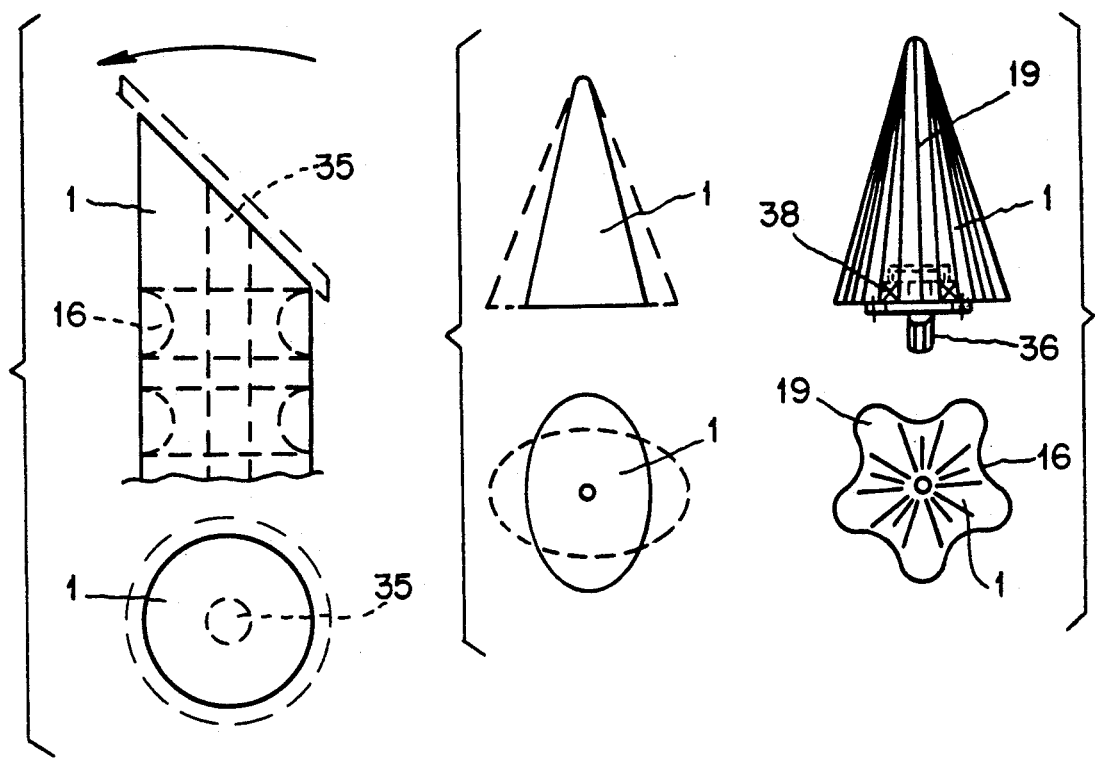

FIG. 21 shows a cylinder, which may be solid or hollow and is preferably truncated at the outer end to an enclosed angle at the front of up to around 30°. The length of the element may be varied to suit requirements, but preferably it may be confined to 6 times, most preferably to 2 to 3 times, the maximum diameter. Mounting may be arranged to be radial, reclined or forwardly inclined by up to 45°, or more for special purposes. Optional waisting to form annular recesses may be provided. Additionally there may be provided on the outer, preferably slanting surface an oversized oval shoe portion 9, as shown in broken outline, for diverting into favourable paths detached crop particles which may be sliding along the cylinder. FIG. 21 may also represent a front elevation and plan view of a cylindrical element 1.

FIG. 22 shows a crop stripping element in the form of a cone with an elliptical base which may be mounted so that the major axis is oriented in or transverse to the direction of movement. Predetermined alternative settings may be provided, preferably by self-locking means, and may be used to adapt the stripping device to different crops and conditions.

FIG. 23 shows a fluted cone with rounded ribs 19. Conveniently, provision may be made for this type and some other discrete crop stripping elements to be mounted so that the elements are self-rotating, to increase their effectiveness and to spread wear evenly. Optionally a bearing 38 may be provided in the base of the element to facilitate rotation. Optionally also it may be arranged the the flutes are shaped to be helical to induce rotation.

Figure 24:
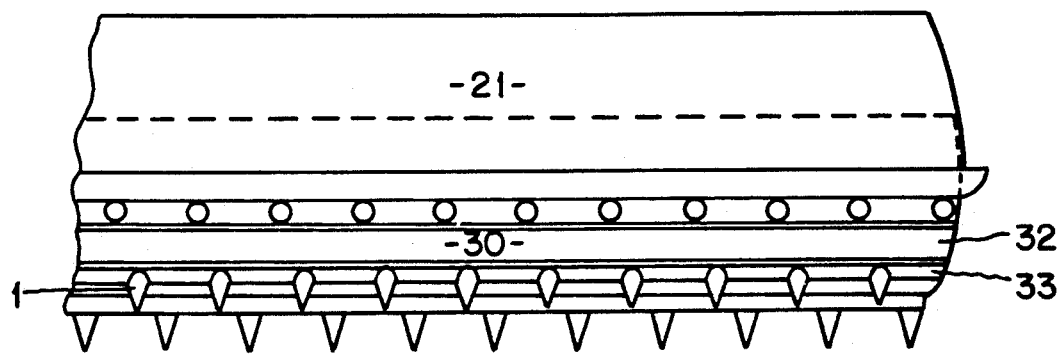
FIG. 24 is a perspective front elevation of a crop stripping rotor and its crop containment/guide cover embodying the invention.

FIG. 24 is a perspective front elevation, on a reduced scale, of a crop stripping rotor 30 and its crop guide cover 21. Crop engaging elements 1 are cone-shaped, helically arranged and secured to hollow mounting bars 33 attached to moveable support means 32. Conveniently the cone shape of elements 1 may be confined to the crop engaging front region, and the inner regions of some or all of the elements may be cylindrical.

Conveniently, the harvesting apparatus described in the foregoing may be used with or without seed separating components. In some instances as clean a seed sample as possible may be demanded, whilst in others nothing, or only the coarsest non-seed fraction, may need to be removed.

Conveniently, the header shown in FIG. 1 may replace the conventional header of a combine-harvester. Optionally, it may be provided simply with means for conveying the collected material into a container or trailer.

In the harvesting by stripping of grain crops, such as barley, wheat and oats, much of the flag leaf and the chaff are removed from the plants incidentally by the stripping device. These botanical fractions, unlike the straw stems, can have a high nutritional value, equivalent to the highest quality hay, and collection of the detached MOS before or after separation of the grain can be of substantial economic benefit to farmers who rear ruminant animals.

A practical disadvantage of the MOS associated with harvesting by stripping is its low bulk density. Conveniently therefore stripper headers may be attached, as the intake device, to forage harvesters, to increase MOS density by comminution, and to balers or briquetting machines, for compacting the material into dense large or small packages respectively. Passing the harvested material through a chopping mechanism has the added advantage that the chopping rotor dislodges any unthreshed seeds.

There will now be considered the important dimensions and general arrangements which are appropriate for the effective operation of the embodiments of the invention. The requirements of different seed crops may vary appreciably, depending on seed size, stem thickness, crop maturity and growth habit.

For dwarf crops having low seed or fruiting bodies the minimum ground clearance under the tip envelope of the seed stripping device may be <25 mm, and the effective radius of the stripping rotor preferably may be no greater than 200 mm. A small tip radius is most readily provided by the vertically or forwardly inclined continuous-belt type stripping apparatus, but in short crops stripping rotors of small diameter also perform satisfactorily without wrapping.

For the most commonly grown crops, particularly cereal and pulse crops, the effective length of the crop stripping elements may be preferably 40–160 mm, most preferably 50–80 mm. The overall length range of the elements for all types of crop may include 20 and 240 mm. Conveniently the crop stripping device may have different tip radii as a result of the elements extending outwards from the moveable support means for different distances, and transverse and/or circumferential arrays of crop stripping elements may comprise different types of element.

Conveniently the effective width of wedge-form crop stripping elements may vary between 10 and around 200 mm, preferably between 20 and 80 mm.

Preferably the lateral inclination of the principal plane of the crop engaging surface of wedge-form crop stripping elements in 10° to 65° relative to a radial plane perpendicular to the transverse rotor axis.

Conveniently the maximum effective radius of seed stripping rotors for the majority of crops in temperate climates may be around 500 mm, and the maximum effective length of a continuous belt-type seed stripping device 1500 mm. The preferred effective radius of a crop stripping rotor for general purpose use ranges between 200 and 350 mm.

Conveniently the tip speeds of the crop engaging elements on a crop stripping rotor or belt may vary between 8 and 40 m/s, the preferred range being 12-30 m/s, and the most preferred 15-24 m/s.

I claim:

1. Apparatus for harvesting crops comprising:
   a mobile support structure for movement over the ground;
   movable support means extending transversely across the direction of forward movement of the apparatus;
   a plurality of crop engaging elements secured to the movable support means and extending longitudinally outwardly from said support means;
   means mounting said movable support means for movement, relative to said support structure, such as to cause said crop engaging elements to comb through a naturally disposed uncut crop into which the movable support structure is moved;
   at least some of said crop engaging elements comprising crop stripping elements, each having, at least in an outer region thereof, a form which, in section through the element substantially perpendicular to the direction of longitudinal extent of the element, presents the configuration of a wedge pointing in the direction of movement of the element consequent upon said movement of the movable support means whereby the crop stripping element presents a narrow leading edge facing in the direction of movement of the element during such movement of the movable support means, and each crop stripping element having reclined side surfaces with outer boundaries shaped to promote smooth sliding and funnelling of crop material into principal inwardly and circumferentially extending crop engagement channels formed between laterally and circumferentially adjacent elements;
   means for imparting said movement to the movable support means; and
   crop containment and guide means extending over or under the apparatus, whereby, in operation as the apparatus is advanced through a naturally disposed uncut crop, and the movable support means is moved by said driving means, the crop stripping elements will comb through the crop to penetrate and split the crop mass apart and to detach and recover by lateral impelling wanted plant parts, and the crop containment and guide means will prevent detached wanted crop parts from becoming lost and will direct them rearward for collection.

2. Apparatus according to claim 1 in which the wedge effective in the direction of rotation is of acute wedge form.

3. Apparatus according to claim 1 in which each crop engaging element has side boundaries which converge inwardly, or first converge and then diverge inwardly, from the distal region.

4. Apparatus according to claim 3 in which the crop engaging elements each have an outer wedge shaped shoe, for moving the undisturbed and unsupported crop mass apart, and a stem portion, for detaching and impelling wanted plant parts.

5. Apparatus according to claim 4 in which said stem portion is outwardly flared, tapered or recessed towards the boundaries of the shoe.

6. Apparatus according to claim 1 in which the crop engaging elements are provided with cavities to facilitate mounting or to afford favorable yielding characteristics.

7. Apparatus according to claim 1 in which at least some of said crop engaging elements are pliable and/or hollow elements which are provided internally with outwardly extending reinforcing fibers to prevent elongation under centrifugal effect.

8. Apparatus according to claim 1, in which at least some of said crop engaging elements are elongate elements which have one or more regions in which the cross-sectional area is reduced to such an extent that in operation of the apparatus those regions act as multi-directional joints or hinges.

9. Apparatus according to claim 1, in which at least some of said crop engaging elements provide a first spine portion affording a leading edge of the wedge and freely yielding flaps projecting laterally and rearwardly from the spine portion.

10. Apparatus according to claim 1 in which the crop engaging elements are in the general form of perpendicular or oblique cones and cylinders, at least in the crop engaging front regions.

11. Apparatus according to claim 10 in which each crop engaging element has one or more annular protrusions or recesses to contribute to the stripping effect.

12. Apparatus according to claim 10 in which the crop engaging elements have cross-sectional shapes which provide a respective major and a minor axis of each element so that either axis may be oriented in or across the direction of rotation, to meet different requirements for stripping.

13. Apparatus according to claim 1 in which each crop engaging side and outwardly extending boundary region of a crop stripping element is formed from front to rear of a smooth continuous surface, or surfaces, free of outwardly extending abrupt or definitive edges and other disruptions or surface discontinuities, to detach plant parts by the effects of beating and avoid the mechanism of spacing and other edge-induced effects.

14. Apparatus according to claim 1 in which the crop engaging elements are secured indirectly to said moveable support means, said elements being secured to hollow or solid transverse members or bars.

15. Apparatus according to claim 14 in which the crop-facing regions of said transverse members are adapted to contribute to the crop stripping effect and to the impelling of detached plant parts towards a collection facility.

16. Apparatus according to claim 1 in which crop engaging elements are adapted to rotate in operation of the apparatus about their outwardly extending axes.

17. Apparatus according to claim 1 in which the moveable support means is driven to move the crop engaging elements in the overshot or in the undershot mode.

18. A machine for harvesting seed and forage crops incorporating as an intake section an apparatus as claimed in claim 1.

19. A machine for chopping seed and forage crops incorporating as an intake section an apparatus as claimed in claim 1.

20. A machine for compacting field crops and crop residues incorporating as an intake section an apparatus as claimed in claim 1.

21. A method of harvesting a crop comprising:
providing an apparatus for harvesting crops comprising:
a mobile support structure for movement over the ground;
movable support means extending transversely across the direction of forward movement of the apparatus;
a plurality of crop engaging elements secured to the movable support means and extending longitudinally outwardly from said support means;
means mounting said movable support means for movement, relative to said support structure, such as to cause said crop engaging elements to comb through a naturally disposed uncut crop into which the movable support structure is moved;
at least some of said crop engaging elements comprising crop stripping elements, each having, at least in an outer region thereof, a form which, in section through the element substantially perpendicular to the direction of longitudinal extent of the element, presents the configuration of a wedge pointing in the direction of movement of the element consequent upon said movement of the movable support means whereby the crop stripping element presents a narrow leading edge facing in the direction of movement of the element during such movement of the movable support means, and each crop stripping element having reclined side surfaces with outer boundaries shaped to promote smooth sliding and funnelling of crop material into principal inwardly and circumferentially extending crop engagement channels formed between laterally and circumferentially adjacent elements;
means for imparting said movement to the movable support means; and
crop containment and guide means extending over or under the apparatus, whereby, in operation as the apparatus is advanced through a naturally disposed uncut crop, and the movable support means is moved by said driving means, the crop stripping elements will comb through the crop to penetrate and split the crop mass apart and to detach and recover wanted plant parts, and the crop containment and guide means will prevent detached wanted crop parts from becoming lost and will direct them rearward for collection;
moving through the uncut crop said apparatus;
driving said movable support means so that said crop engaging elements comb through the naturally disposed crop at a front region of the apparatus, whereby said crop stripping elements form bevelled wedges effective in the direction defined by rotation of the elements around the transverse axis of the support means and movement of the apparatus through the crop, to penetrate and split the crop mass apart and to detach wanted parts from the plants; and
impelling detached crop parts substantially laterally and rearwardly towards a collection facility.

22. A method according to claim 21 whereby the wanted crop parts are detached and impelled towards the said collection facility at least in part by the effects of crop-facing regions of transverse mounting members provided on said moveable support means.

23. A method according to claim 21 whereby the wanted crop parts are detached by the effects of beating the crop, without scraping it, by using crop stripping elements which are devoid in the side regions of outwardly extending abrupt or definitive edges and other disruptions or surface discontinuations.

24. A method of harvesting seed and forage crops by using a machine substantially as claimed in claim 19.

25. A method of harvesting field crops and crop residues by using a machine substantially as claimed in claim 20.

* * * * *